Nov. 30, 1954    W. J. OGLE    2,695,625
BUTTERFLY VALVE
Filed June 14, 1954

INVENTOR
William Jackson Ogle

BY *Ahley & Ahley*

ATTORNEYS

# United States Patent Office 2,695,625
Patented Nov. 30, 1954

2,695,625

BUTTERFLY VALVE

William Jackson Ogle, Lubbock, Tex., assignor to Gifford-Hill-Western, Inc., Dallas, Tex., a corporation of Texas Application June 14, 1954, Serial No. 436,404

5 Claims. (Cl. 137—315)

This invention relates to new and useful improvements in valves.

One object of the invention is to provide an improved valve of such construction as to be particularly adapted to installation in the flow line of an irrigation conductor.

A particular object of the invention is to provide an improved valve having a tubular body and a valve member equipped with a flexible marginal portion adapted to seat in the body and to maintain sealing contact therewith after initial movement away from its seat, whereby flow through said body may be closely regulated.

An important object of the invention is to provide an improved valve having an annular circumferential groove in the bore of its body with a valve member pivotally mounted in the bore and having an elastic peripheral margin of greater diameter than said bore adapted to seat in the groove, and, when un-seated, frictionally engage said bore for holding the valve member in adjusted open positions.

Another object of the invention is to provide an improved valve, of the character described, wherein the body is formed of thin wall tubing having an extruded bead providing an internal, annular, recessed seat for engagement by a valve disk pivotally supported in the bore of said body by a diametric operating lever, the lever being journaled in the wall of the body downstream of the disk to eliminate the necessity for packing.

A construction designed to carry out the invention will be hereinafter described together with other features of the invention.

Figure 1:
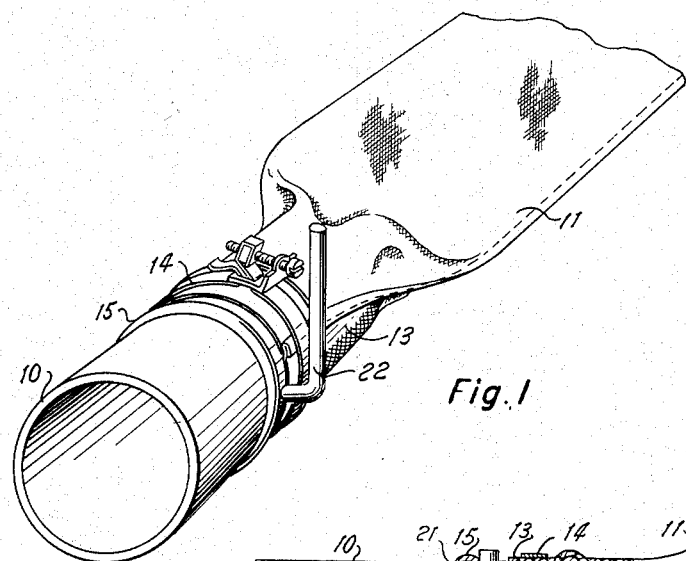
Figure 2:
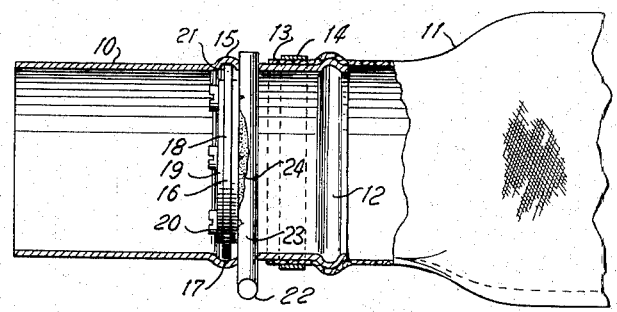
Figure 3:
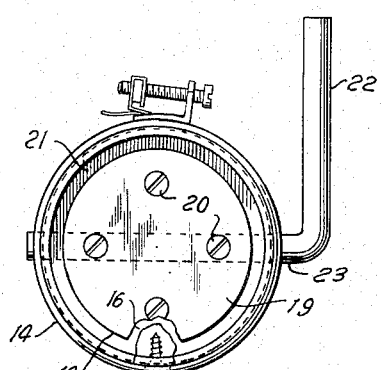
Figure 4:
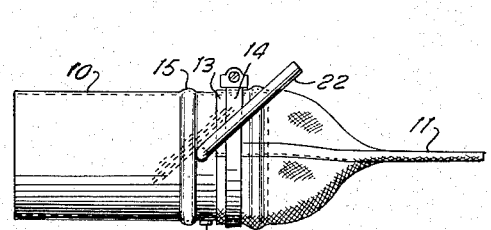

The invention will be more readily understood from a reading of the following specification and by reference to the accompanying drawing, wherein an example of the invention is shown, and wherein:

Fig. 1 is a perspective view of a valve constructed in accordance with the invention and connected with a canvas pipe, Fig. 2 is a longitudinal, sectional view of the valve and pipe, Fig. 3 is an end elevational view of the valve, and Fig. 4 is a side elevational view of the valve with the valve disk being shown partially open in broken lines.

In the drawing, the numeral 10 designates a tubular valve body formed of thin wall tubing or other liquid conduit commonly used for irrigation purposes and may be of aluminum or other suitable metal or material. Although not illustrated, the valve body is adapted to form or be connected to each lateral of a main conductor of larger diameter. The discharge end of the body is connected to the inlet end of a flexible, tubular conductor or canvas pipe 11, the details of which are unimportant to this invention. An annular enlargement or extruded bead 12 is formed on the outlet end of the body for engagement by a reduced neck 13 on the inlet end of the pipe 11. Preferably, the internal diameter of the neck is merely sufficient to fit snugly around said body and be distorted by or stretched over the head. A conventional clamp 14 is fastened around the end of the neck 13 inwardly of the bead 12 to prevent displacement from the body.

The valve body 10 has a second annular, upset bead or extrusion 15 intermediate its ends. A circular valve disk 16 has its peripheral or marginal edge seated in the annular, internal groove or seat 17, concave in cross-section, provided by the bead 15 to close the bore of the body against communication with the pipe 11. The disk, which is a part of a valve member 18, is formed of flexible or yieldable material, such as rubber or similar material suitable for the purpose, and is of a diameter substantially equal to the diameter of the groove or seat. Circular cheek plates 19, of a diameter considerably less than the internal diameter of the body confine the disk in concentric relation therebetween and are secured together by transverse screws 20, whereby the annular lip or marginal portion 21 of said disk is exposed and free to flex when the valve member is opened and closed. When the valve member is closed and pressure is applied thereto, the marginal portion 21 will be flexed from its normal position, as shown in Fig. 2, to contact portions of the annular wall forming the concave seat 17.

An angular lever 22 has a lateral arm or extension 23 extending diametrically through and journaled in the wall of the body to provide a shaft which is suitably secured, such as by soldering 24, to the downstream plate 19. In assembling the valve, the valve member 18 is inserted through one end of the tube until the member more or less snaps into position in the groove wherein the valve member will be held in proper alignment so that the actuating handle may be attached thereto. When the valve member 18 is closed, the lever 22 is upright and free to be grasped for swinging said valve member. Due to the seating of the marginal portion 21 of the disk in the groove 17, a portion of said disk, when unseated, is in constant frictional engagement with the bore of the body so as to hold the valve member in adjusted open positions. Thus, when the valve member is swung toward a closed position, the peripheral contact of the disk 16 with the wall of the body is sufficient to form a partial shut-off before said disk reaches and seats in the groove.

The construction of the valve is such that no special fittings, seats or packing glands are required, the shaft 23 being located on the downstream side of the valve member. The seating of the valve disk 16 in the groove 17 is very important because it enables the use of an oversized disk with respect to the internal diameter of the body which assures a friction seal when the periphery of said disk is swung out of said groove and into engagement with the bore of said body. Thus, the flow of liquid past the valve member 18 may be regulated to a very definite degree. In order to prevent movement of the valve member beyond the groove or seat, a stop in the form of a screw 25 extends through the wall of the body adjacent and on the downstream side of said valve member (Figs. 3 and 4). The stop screw is of sufficient length to project inwardly of the lip 21 for engagement by the downstream plate 19. It is noted that the disk may be readily replaced by removing the screws 20. The valve body 10 may be of any suitable length and may be formed of inexpensive thin wall tubing capable of being economically upset to provide the beads 12 and 15 as well as the groove or seat 17. Since the seat is enlarged or recessed with respect to the bore of the body and is snugly engaged by the disk, it is manifest that opening movement of the valve member is resisted and positive closure of said member assured by frictional contact of the annular lip of said disk with the arcuate surfaces of said seat.

The foregoing description of the invention is explanatory thereof and various changes in the size, shape and materials, as well as in the details of the illustrated construction, may be made, within the scope of the appended claims, without departing from the spirit of the invention.

What I claim and desire to secure by Letters Patent is:

1. A flow valve including a tubular body having a thin wall with an annular external circumferential bead formed in the wall to provide an internal annular groove, the groove having a diameter greater than the internal diameter of the body, a valve member pivotally mounted within the body and having an annular flexible margin, the margin adapted to be seated in said groove to shut off flow through said body, said margin having a diameter substantially equal to the diameter of the groove in the plane of said valve when said valve is in seated position and said groove having a less diameter in parallel planes on either side of said first plane, and means for pivoting the valve member to move its margin into and out of engagement with said groove.

2. A flow valve as defined in claim 1 further characterized in that said groove is arcuately concave in cross-section.

3. A flow valve as defined in claim 1 further characterized in that said margin has a diameter greater than the internal diameter of said body and is adapted to maintain sealing contact with the inner wall of said body when initially moved out of said groove.

4. A flow valve as defined in claim 1 further characterized in that said margin is adapted to be flexed from its seated position in said groove to contact portions of said groove having a lesser diameter when pressure is applied to said margin.

5. A flow valve including a tubular body having an annular circumferential bead positioned in the wall thereof and providing an internal annular groove, said groove having a diameter larger than the internal diameter of said body, a valve member pivotally mounted within the body and having an annular flexible marginal portion of a diameter greater than the internal diameter of said body, said marginal portion adapted to seat in said groove to shut off flow through said body, said groove having an axial length not substantially greater than the width of said marginal portion, and means for moving the valve out of and into engagement with said groove.

References Cited in the file of this patent

UNITED STATES PATENTS

| Number | Name | Date |
|---|---|---|
| 433,060 | Zehren | July 29, 1890 |
| 2,586,927 | Fantz | Feb. 26, 1952 |
| 2,657,896 | Muller | Nov. 3, 1953 |

FOREIGN PATENTS

| Number | Country | Date |
|---|---|---|
| 22,932 | Great Britain | 1911 |
| 678,619 | Great Britain | 1952 |